United States Patent [19]

Kalinowski

[11] Patent Number: 4,790,542
[45] Date of Patent: Dec. 13, 1988

[54] FURNACE FRONT WALL SEALS

[75] Inventor: Richard Kalinowski, Osgoode, Canada

[73] Assignee: Combustion Engineering, Inc., Windsor, Conn.

[21] Appl. No.: 129,571

[22] Filed: Dec. 7, 1987

[51] Int. Cl.[4] .............................................. F16J 15/10
[52] U.S. Cl. ......................................... 277/12; 277/9;
 277/105; 277/227; 277/DIG. 6; 285/16;
 285/337; 285/348
[58] Field of Search ................... 285/15, 16, 337, 348;
 277/9, 12, 105, 106, 227, DIG. 6

[56] References Cited

U.S. PATENT DOCUMENTS

| | | | |
|---|---|---|---|
| 801,596 | 10/1905 | Kerr et al. | 285/337 |
| 807,739 | 12/1905 | Hanson | 285/337 |
| 1,078,009 | 11/1913 | Taylor | 285/337 X |
| 2,783,065 | 2/1957 | Martin | 285/337 X |
| 3,152,816 | 10/1964 | Smith | 285/337 X |
| 3,746,370 | 7/1973 | Aulisa | 285/15 |
| 4,377,291 | 3/1983 | Albertini | 277/105 |
| 4,433,860 | 2/1984 | Lindquist | 285/DIG. 16 X |
| 4,581,882 | 4/1986 | Pallo et al. | 277/227 X |
| 4,601,304 | 7/1986 | Schobl | 277/9 X |

FOREIGN PATENT DOCUMENTS 61-244969 10/1986 Japan ............................ 277/DIG. 6

Primary Examiner—Robert S. Ward
Attorney, Agent, or Firm—Arthur E. Fournier, Jr.

[57] ABSTRACT

A gland seal for addition to a boiler and furnace structure which has pipes (20) passing through a waterwall (12) and seal box (30). The gland seal includes a packing (40) of ceramic rope of square cross-section wrapped on the pipes (20) adjacent the front plate (34) of the seal box (30) with a hose clamp (41) radially constricting the packing and a pressure plate (42) driven by nuts (46) on threaded studs (44) adjacent the pipes (20) axially constricting the packing to eliminate ash leakage through the waterwall joint.

5 Claims, 3 Drawing Sheets

FURNACE FRONT WALL SEALS

BACKGROUND OF THE INVENTION

This invention relates to the repair of front seals in a waterwall of a boiler furnace. Typically, such furnaces are designed to include front seal boxes where, for example, superheater and reheater pipes pass through the furnace waterwall and into a header enclosure which contains a superheater outlet header and a reheater outlet header. As these seal boxes are cycled thermally during use, the original seals can give way to the point that they permit ash leakage into the header enclosure.

Ash leakage into a superheater header and reheater header enclosure is of concern since at the high temperatures resulting from the burning of fuel in the furnace, fractions of the ash become partially fused and sticky thereby adhering to surfaces and permitting chemicals in the ash to attack materials such as the alloys used in superheaters and reheaters. In addition, the buildup of ash in the bottom of the enclosure creates a serious weight problem which can dimensionally distort and damage the enclosure and the pipes and headers it contains and their connections to the system. An extreme buildup in weight within the elevated header enclosures also creates an obvious safety problem.

As will be well recognized by those skilled in the art, the function of a superheater is to increase the temperature of the steam generated in the boiler. Steam enters the superheater at saturated temperature in a practically dry saturated condition, and consequently the absorption of heat appears as sensible heat in increasing the steam temperature.

The reheater receives superheated steam which has partly expanded through the power generating turbine. The function of the reheater is to re-superheat this steam to a desired temperature.

Furnace design must take into consideration water heating and steam generation in the waterwalls as well as the processes of combustion and ash production. Practically all large modern boilers are designed with walls comprised of water cooled tubes to form complete metal coverage of the furnace enclosure. Waterwalls usually consist of substantially vertical tubes arranged tangent, or approximately so, and these are connected at top and bottom to headers. In addition, areas outside of the furnace which form enclosures for sections of superheaters, reheaters and often economizers are also designed in a manner similar to the furnace, using either water or steam cooled tube surfaces. Present practice is to use tube arrangements and configurations which permit practically complete elimination of refractories in the areas exposed to high temperature gases. Accordingly, it is important to have effective seals against ash leakage where pipes for the boiler components must pass into and out of the furnace through waterwalls.

SUMMARY OF THE INVENTION

Utility boilers with horizontal (drainable) superheater and reheater assemblies require that their main outlet headers be located approximately six feet in front of the front waterwall, outside of the furnace, but in an enclosure. As a result of this arrangement, superheater and reheater tubes must penetrate through the waterwall. Normally a "furnace front wall seal box" is used to isolate the furnace from the header enclosure. However, if these seal boxes begin to leak, ash will flow from inside the furnace into the header enclosure, eventually filling it up. Once the leakage begins, there is no "adjustment" that can be made to stop the leakage. In order to solve the problem, the existing seal boxes must be "ripped out" and replaced.

The instant invention is an improvement in a furnace waterwall having a pipe extending therethrough and through a seal box front plate. It is used when the seal box permits ash leakage as a gland seal outside of the seal box. Its advantages are that: it is inexpensive compared to existing seal box design; it can be added directly onto an existing boiler seal box and the old and leaking seals do not have to be ripper out; it is fully adjustable by merely tightening the nuts and the hose clamp; and, it is fully maintainable because the new gland seals are fully accessible, are not covered over by a seal box, and include easily replaceable components.

The gland seal includes a pair of side-by-side ceramic rope packing pieces of square cross-section surrounding the pipe and abutting the seal box front plate. The ceramic rope is radially constricted by a stainless steel hose clamp band and axially constricted in the direction of the seal box front plate by a compression plate adjacent the pipe. The compression plate is driven toward the seal box front plate by threaded studs with tightening nuts on their outer ends to transmit forces from the nuts to the compression plate and thereby to axially compress the radially constructed ceramic rope in a manner which will stop ash-leakage.

DETAILED DESCRIPTION OF THE PREFERRED EMBODIMENT

Figure 1:
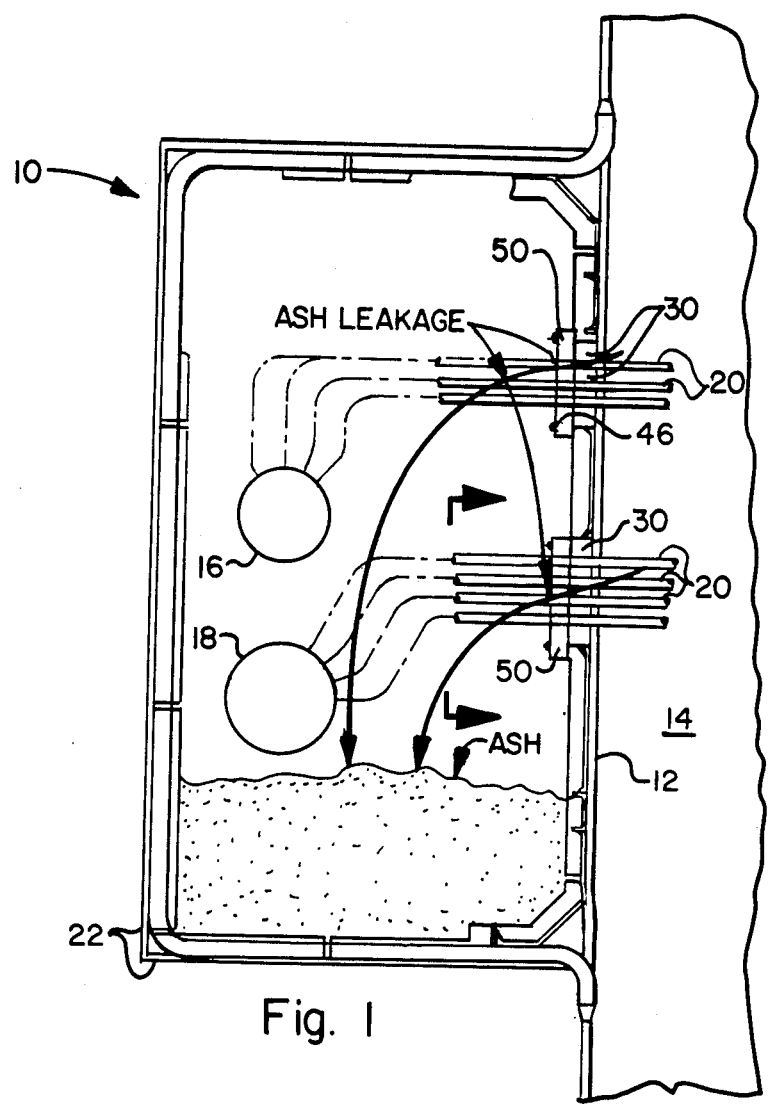
FIG. 1 is a fragmentary cross-sectional elevational view of the header enclosure on the upper portion of a front furnace waterwall, showing ash leakage and buildup and an improved gland seal in position to limit them.
Figure 2:
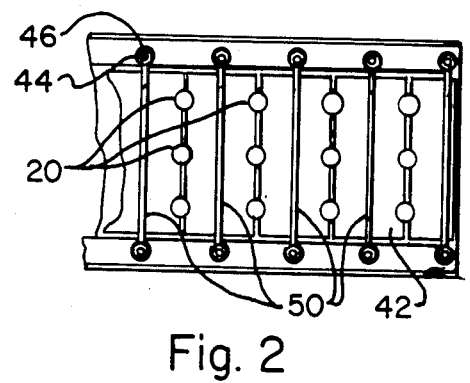
FIG. 2 is a fragmentary front elevational view taken along the line 2—2 of FIG. 1.
Figure 3:
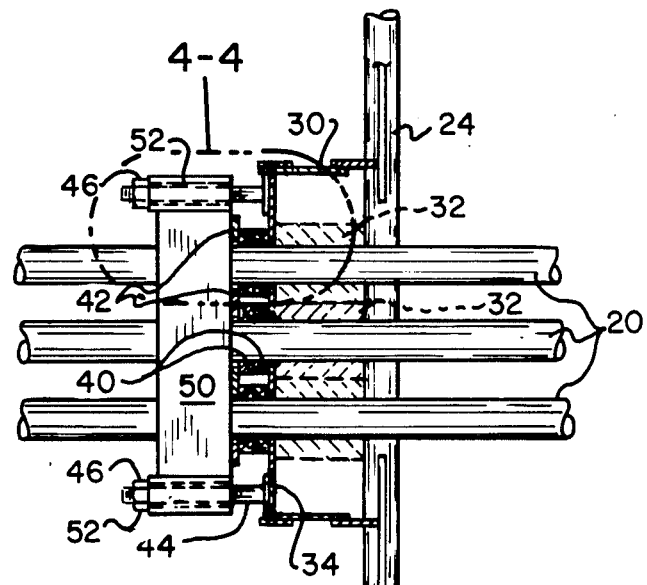
FIG. 3 is a slightly enlarged side elevational view of the improved gland seal of FIGS. 1 and 2.
Figure 4:
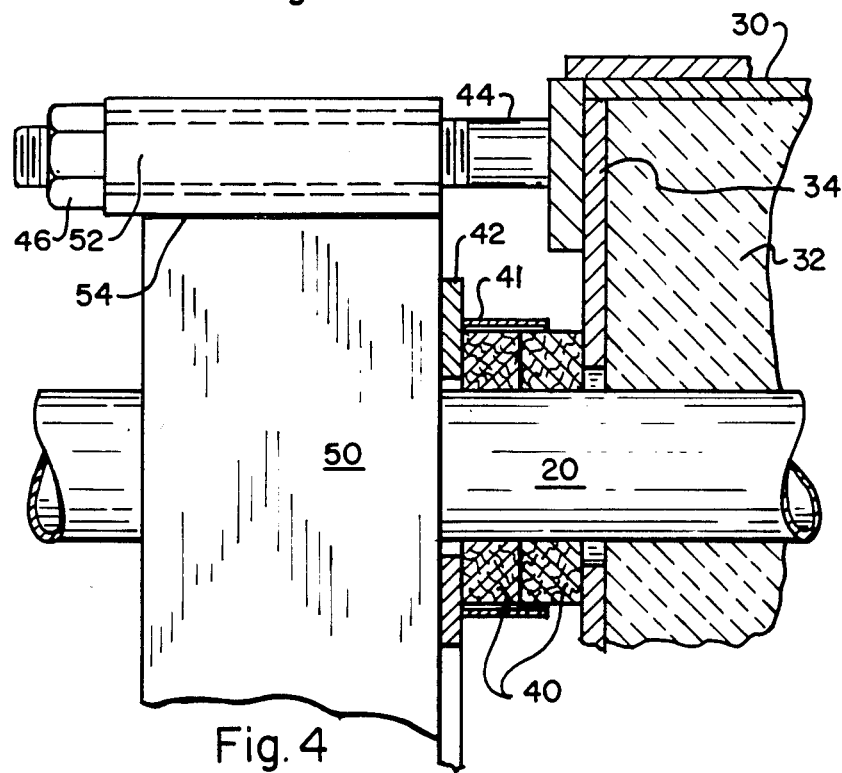
FIG. 4 is an enlarged fragmentary portion showing the circled area 4—4 of FIG. 3.
Figure 5:
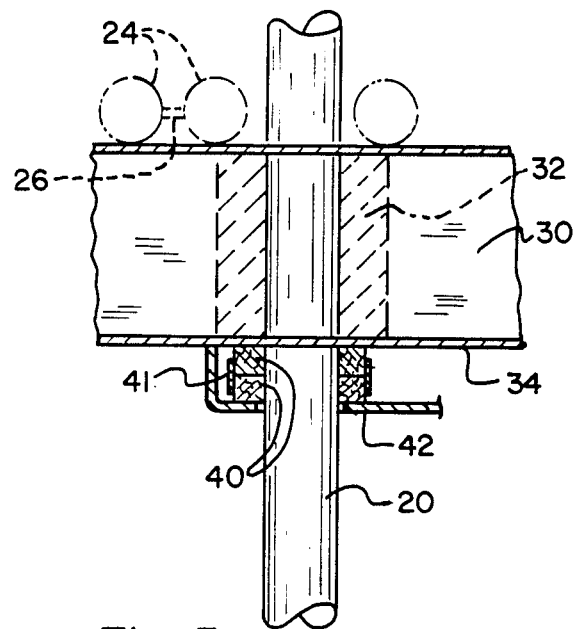
FIG. 5 is a fragmentary top plan view of a portion of the improved gland seal in front of the original seal box 30.
Figure 6:
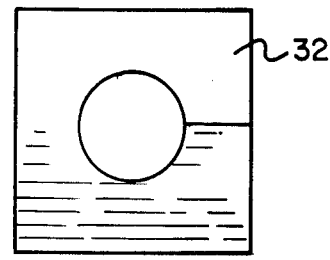
FIG. 6 is a front elevational view of a mineral fiber block of the type surrounding pipes 20 in original seal box 30.

The numeral 10 generally designates an enclosure which extends from an elevated portion of the front waterwall 12 of a boiler furnace 14. The enclosure 10 includes a superheater outlet header 16 and a reheater outlet header 18, each of which is connected to pipes 20 which pass through waterwall 12 and into the furnace 14. The waterwall 12 is made up of pipes 24 and fins 26 welded in a formation parallel to each other in a manner well known to those in the art. See the reference book entitled *COMBUSTION ENGINEERING*, copyright 1966 by Combustion Engineering, Inc., Library of Congress Catalog Card Number 66-23939. The enclosure also has waterwalls inside of a plate wall structure 22.

At the points of passage of the pipes 20 through the waterwall 12, between the vertical pipe components 24 thereof, furnace front wall seal boxes 30 are mounted.

The seal boxes 30 have exterior steel plate shells and contain mineral fiber insulation blocks 32 of a material known as Roxul No. 80. The front plate 34 of the steel shell of seal box 30 covers the blocks 32. It is through the joint made between the pipes 20 and the waterwall 12 by the thus constructed seal box 30 that ash leakage into enclosure 10 occurs.

The improved gland seal is added to the structure described above by wrapping pipes 20 with side-by-side braided ceramic rope packing pieces 40 of square cross-section, sold by MEVCO Products Co. Ltd., 2091 Chartier Ave., Dorval, Quebec, Canada H9P IH3, as "MEVCO 4160". The ceramic rope is wrapped adjacent front plate 34 and radially clinched and restricted by means of a 304 stainless steel hose clamp 41, such as that sold by Spae-Naur, Inc., 815 Victoria Street North, Kitchener, Ontario, Canada N2G 4BI, as HS-54 or HS-60. These clamps 41 include a conventional tightening screw (not shown). Scalloped compression plates 42 are mounted on the outside packing pieces 40, and are driven toward the seal box front plate 34 by threaded studs 44 attached, as by welding, to front plate 34 of seal box 30. The scalloped edges of plates 42 permit adjacent edges of adjacent plates 42 to substantially surround the pipes 20 and fully contact the ceramic rope 40 to constrict it in an axial direction relative to pipes 20. The threaded studs 44 have tightening nuts 46 thereon which advance the compression plates 42 through contact with vertical plates 50 having collars 52 welded thereto by means of welds 54. The collars 52 surround studs 44 and are driven by torquing nuts 46 to move the scalloped compression plates 42 against the constructed ceramic rope pieces 40. Thus, an effective seal is added without the necessity of ripping out the old seal box and ash leakage and build up, as illustrated in FIG. 1, is substantially eliminated.

I claim:

1. In a furnace waterwall having a pipe extending therethrough and through a seal box front plate, the improvement comprising a gland seal outside of the seal box which includes:
    a ceramic rope packing surrounding said pipe and abutting said seal box front plate;
    a metal clamp band surrounding and radially constricting said ceramic band; and
    a compression plate adjacent said pipe and compressing said ceramic rope in the direction of said seal box front plate.

2. The improvement of claim 1 in which the ceramic rope is square in cross-section.

3. The improvement of claim 2 in which two side-by-side pieces of ceramic rope which are square in cross-section are used in the gland seal.

4. The improvement of claim 1 in which the metal clamp band is a stainless steel hose clamp.

5. The improvement of claim 1 in which the compression plate is driven toward the seal box front plate by threaded studs with tightening nuts on their outer ends to transmit forces from the nuts to the compression plate and thereby to axially compress the radially constricted ceramic rope.

* * * * *